US011809394B1

(12) United States Patent
Mendiola et al.

(10) Patent No.: US 11,809,394 B1
(45) Date of Patent: Nov. 7, 2023

(54) AMENDMENTS FOR TRANSACTIONAL INDEX (71) Applicant: Workday, Inc., Pleasanton, CA (US)

(72) Inventors: Sergio Mendiola, Dublin, CA (US); Bryan Regis, Dublin, CA (US); Shivender Devarakonda, Pleasanton, CA (US)

(73) Assignee: Workday, Inc., Pleasanton, CA (US)

(*) Notice: Subject to any disclaimer, the term of this patent is extended or adjusted under 35 U.S.C. 154(b) by 86 days.

(21) Appl. No.: 16/879,629

(22) Filed: May 20, 2020

(51) Int. Cl.
G06F 16/22 (2019.01)
G06F 16/23 (2019.01)

(52) U.S. Cl.
CPC ...... *G06F 16/2228* (2019.01); *G06F 16/2379* (2019.01)

(58) Field of Classification Search
CPC .............. G06F 16/2228; G06F 16/2379
See application file for complete search history.

(56) References Cited

U.S. PATENT DOCUMENTS

| | | | | |
|---|---|---|---|---|
| 10,452,675 B1* | 10/2019 | Sivasubramanian | | G06F 16/254 |
| 2003/0093408 A1* | 5/2003 | Brown | ................ | G06F 16/2272 |
| 2005/0050023 A1* | 3/2005 | Gosse | ................... | G06F 16/951 |
| 2011/0071986 A1* | 3/2011 | Schmidt | ................ | G06F 16/217 |
| | | | | 707/684 |
| 2011/0219008 A1* | 9/2011 | Been | ....................... | G06F 16/00 |
| | | | | 707/742 |
| 2011/0252002 A1* | 10/2011 | Ben-Dyke | ............. | G06F 16/213 |
| | | | | 707/661 |
| 2016/0210064 A1* | 7/2016 | Dornemann | .......... | G06F 16/275 |
| 2016/0357853 A1* | 12/2016 | Moore | ................ | G06F 16/3344 |

* cited by examiner

*Primary Examiner* — Allen S Lin
(74) *Attorney, Agent, or Firm* — Van Pelt, Yi & James LLP (57) ABSTRACT A system for indexing includes an interface and a processor. The interface is configured to receive a metadata amendment. The metadata amendment defines a change to a transactional index schema to a first transactional index. The first transactional index comprises a querying system data. The processor is configured to maintain a first state of the first transactional index. The first transactional index does not incorporate the metadata amendment. The processor is configured to build a second transactional index incorporating the metadata amendment, determine whether an indication to switch from the first transactional index to the second transactional index has been received, and indicate to switch from using the first transactional index to the second transactional index for queries regarding a system data.

21 Claims, 11 Drawing Sheets

AMENDMENTS FOR TRANSACTIONAL INDEX

BACKGROUND OF THE INVENTION

An in-memory database system comprises a database structure for storing a large amount of data in an organized way. For example, the database structure comprises a set of tables, a set of linked objects, etc. The in-memory database system typically includes an in-memory transactional index for allowing the database system to be searched. The transactional index incorporates some or all of the data from the database structure arranged in a manner optimized for search efficiency. As transactions are processed by the database system (e.g., adding or modifying data stored in the database system), the transactional index is maintained to stay current. In the event the database schema is modified (e.g., a new data field is added for a data type, a data field is modified for a data type, etc.), the transactional index needs to be completely rebuilt, which can take multiple hours. Typically, the step of rebuilding the transactional index is required to happen offline in order to prevent data inconsistencies from causing errors. This creates a problem wherein the system is required to be offline while the transactional index is rebuilt.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for amendments for a transactional index is disclosed. A system for indexing comprises an interface for receiving a metadata amendment, wherein the metadata amendment defines a change to a transactional index schema to a first transactional index, wherein the first transactional index comprises a query index for querying system data, and a processor for maintaining the first state of the first transactional index, wherein the first transactional index does not incorporate the metadata amendment, building a second transactional index incorporating the metadata amendment, determining whether an indication to switch from the first transactional index to the second transactional index has been received, and indicating to switch from using the first transactional index to the second transactional index for queries regarding the system data.

A system for amendments for a transactional index comprises a database system in communication with a database index system. The database system comprises a database for storing data. For example, the database system comprises a multi-tenanted object-based database system offered using a software-as-a-service model. A multi-tenanted database system comprises a system storing data for a plurality of tenants in silos such that a user associated with a first tenant cannot interact with data associated with a second tenant. A database using a software-as-a-service model comprises a database running on server systems operated by the database provider, and accessed by a database user—for example, using the internet. An object-based database system comprises a database system wherein data is stored in a plurality of objects representing meaningful concepts—for example, worker, financial transaction journal line, etc. Objects in the database system store data and are connected by relationships. The database index system stores a transactional index for the database system. For example, the transactional index comprises a table comprising object data for each object and a reference to the object. The transactional index enables searching the object-based database using a search query on object data—for example, worker name, and is also referred to as a query index. In some embodiments, the transactional index enables responding to queries regarding transaction metadata (e.g., data associated with submitted and/or processed transactions) and system data (e.g., log data, system performance data, usage data, error data, etc.) as well as user data stored in the database. In some embodiments, the transaction metadata and system is stored in objects of the database. When an object definition is modified (e.g., a data field associated with the object is added, modified, or removed), a transactional index representing the new state of the database needs to be built. In order to avoid system downtime while rebuilding the database to reflect the change to the object definition, the new version of the database is built in the background while the old index continues to be used.

When a system developer determines that a change to an object definition is necessary, the developer creates a database amendment representing the change. Database amendments are required to be registered with the database system a predetermined period of time before the object definition change is to take place (e.g., one week before). For example, a plan is made to introduce a new version of the transactional index on a specific date, and developers are informed of an earlier date before which they are required to introduce database amendments in order to have them reflected in the transactional index change. When all amendments for a transactional index change have been received, a transactional index building process is executed in the background. The new transactional index reflecting the amendment or amendments is built while the previous transactional index continues to be used. While the new transactional index is built the previous transactional index is maintained, updated with the results of any database transactions that occur (e.g., the previous transactional index that is being used is updated almost instantaneously for any changes due to transactions occurring). Once the new transactional index is built it is maintained or updated as well, in order to stay current (e.g., the new transactional index is for changes due to the transactions in batches to stay parallel with the previous transactional index). At this point both transactional indices are complete. When the designated time is reached, the previous transactional index is retired and the new transactional index becomes the one accessed for responding to a search request. This change can be made with minimal or potentially zero system down time. The system for amendments for a transactional index improves the computer system by minimizing the down time necessary when updating a transactional index in response to an object definition update for a database system.

Figure 1:
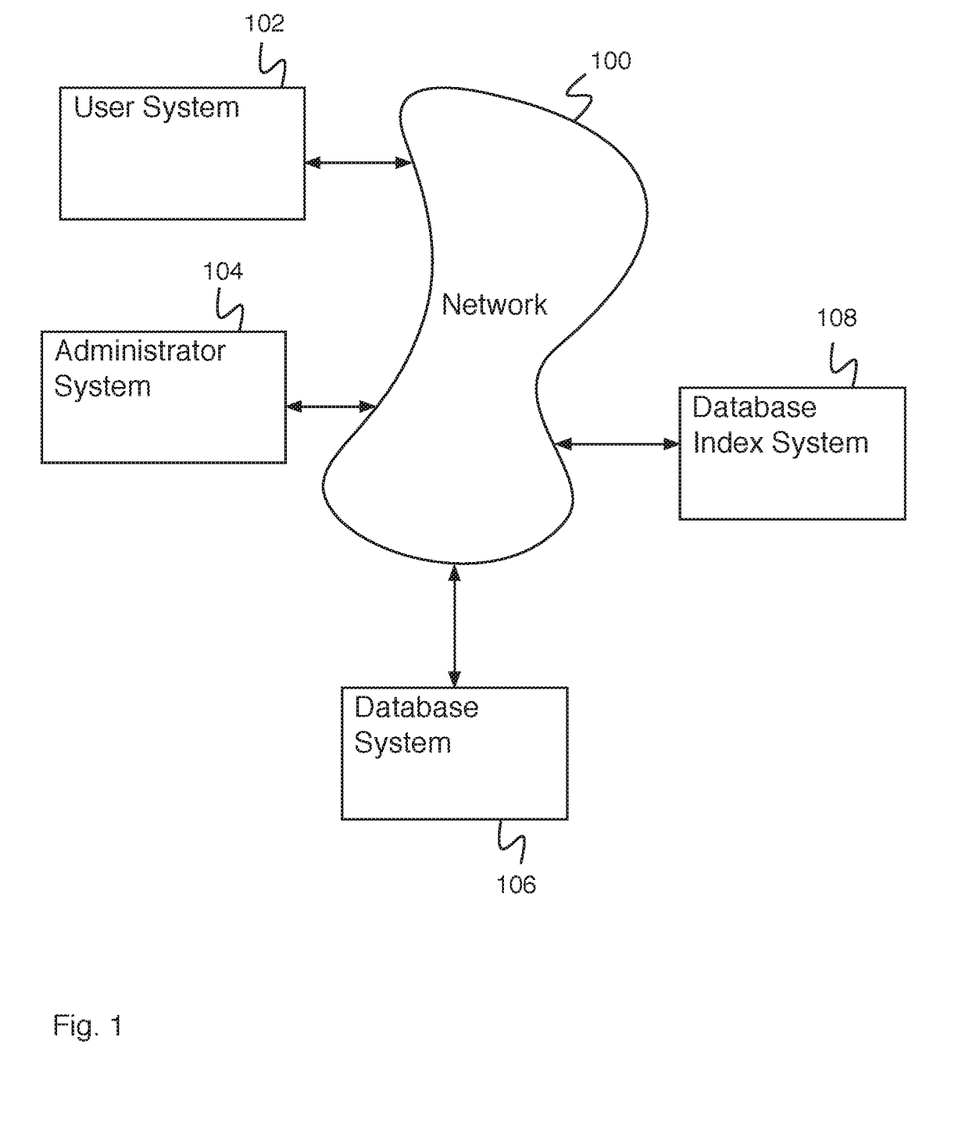
FIG. 1 is a block diagram illustrating an embodiment of a network system.

FIG. 1 is a block diagram illustrating an embodiment of a network system. In some embodiments, the network system of FIG. 1 comprises a network system for a system for amendments for a transactional index. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, database system 106, and database index system 108 communicate via network 100.

User system 102 comprises a user system for use by a user. For example, user system 102 comprises a system for communication, data access, computation, etc. A user uses user system 102 to access database system 106. For example, a user uses user system 102 to access human resources database data on database system 106, a user uses user system 102 to access financial database data on database system 106, a user uses user system 102 to modify data on database system 106, a user uses user system 102 to delete data on database system 106, etc. Administrator system 104 comprises an administrator system for use by an administrator. For example, administrator system 104 comprises a system for communication, data access, computation, etc. An administrator uses administrator system 104 to maintain database system 106. For example, an administrator uses administrator system 104 to start and/or stop services on database system 106, to reboot database system 106, to install software on database system 106, to add, modify, and/or remove data on database system 106, etc.

Database system 106 comprises a database system for storing data. For example database system 106 comprises a database system for storing data in a table-based data structure, an object-based data structure, etc. Database system 106 comprises a human resources database system, a financial database system, a university database system, a medical database system, a manufacturing database system, etc. Database index system 108 comprises a database index system for storing database data. For example, database index system 108 comprises a database index comprising data of database system 106 organized in a way optimized for search efficiency. In some embodiments, database index system 108 comprises part of database system 106. For example, database index system 108 comprises an interface for receiving a metadata amendment, wherein the metadata amendment defines a change to a transactional index schema to a first transactional index, wherein the first transactional index comprises a query index for querying system data, and a processor for maintaining the state of the first transactional index, wherein the first transactional index does not incorporate the metadata amendment, building a second transactional index incorporating the metadata amendment, determining whether an indication to switch from the first transactional index to the second transactional index has been received (e.g., an indication of a use toggle), and indicating to switch from using the first transactional index to the second transactional index for queries regarding the system data. In various embodiments, the toggle control is moved or selected in a user interface by a developer using a user system or an administrator system and that indication is provided to the database index system to indicate that switch to the use of the second transactional index from the first transactional index. In some embodiments, indicating to switch from the first transactional index to the second transactional index comprises indicating a change for a location of an index to be used from a first location of the first transactional index to a second location of the second transactional index. In some embodiments, the toggle indication is based on a time and/or date as indicated by the developer using a user interface and the indication is provided by the database index system and received based on that time and/or date.

Figure 2A:
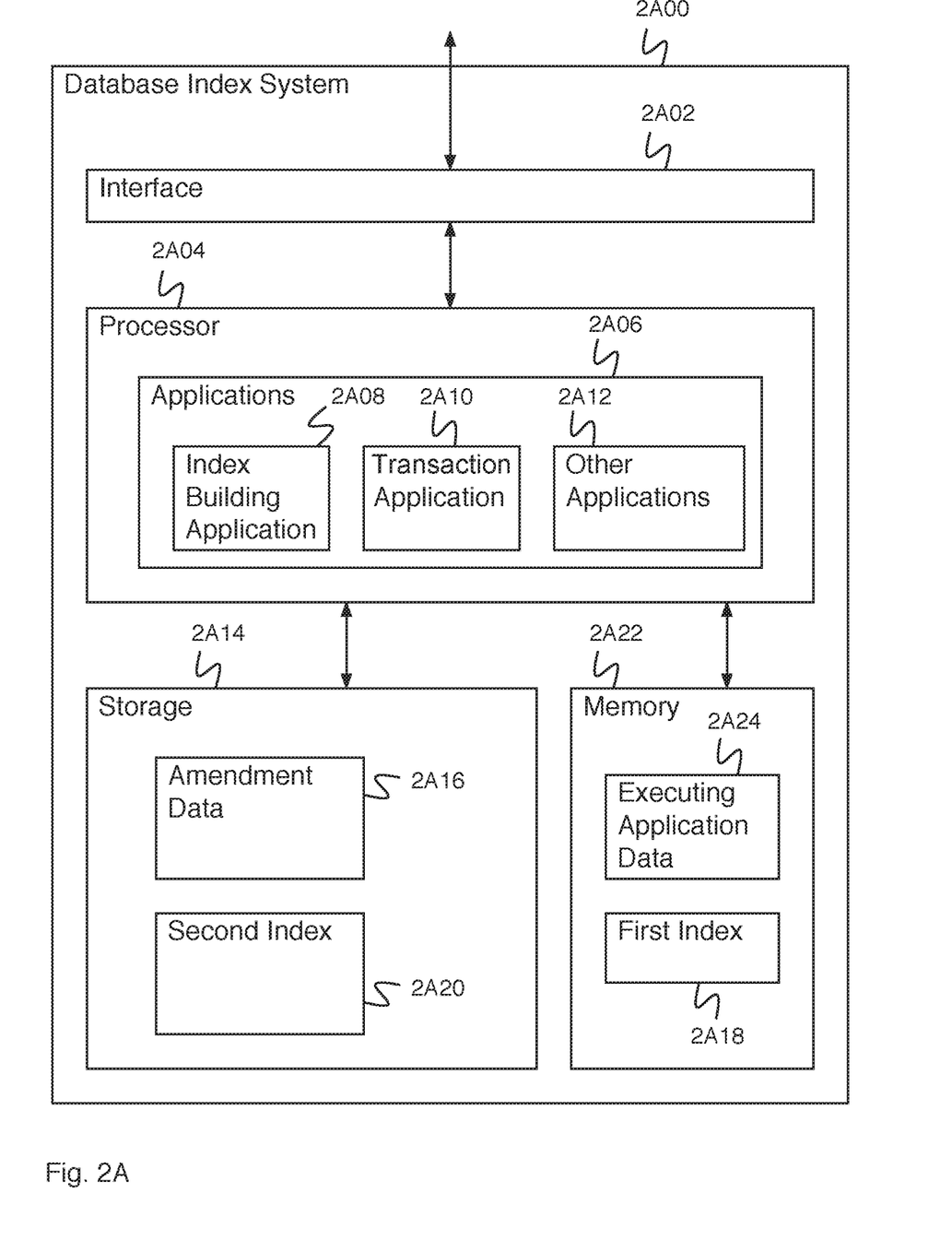
FIG. 2A is a block diagram illustrating an embodiment of a database index system.

FIG. 2A is a block diagram illustrating an embodiment of a database index system. In some embodiments, database index system 2A00 comprises database index system 108 of FIG. 1. In the example shown, database index system 2A00 comprises interface 2A02. For example, interface 2A02 comprises an interface for receiving data, providing data, receiving a request for data, receiving a request to query or search for data, receiving an indication of a database transaction, receiving a metadata amendment, receiving an indication of a database amendment, receiving an indication to create a new index, receiving an indication to switch from a first index to a second index, etc. Processor 2A04 comprises a processor for executing applications 2A06. Applications 2A06 comprises index building application 2A08, transaction application 2A10, and other applications 2A12. For example, index building application 2A08 comprises an application configured to build a transactional index using database data (e.g., using database data from a database system). In some embodiments, index building application 2A08 comprises an application configured to build one or more transactional indices using database data incorporating one or more database amendments. For example, an amendment comprises a modification to an object definition. Transaction application 2A10 comprises an application for searching a transactional index (e.g., in response to a request). Other applications 2A12 comprises any other appropriate applications (e.g., an index maintenance application, a communications application, a chat application, a web browser application, a document preparation application, a report preparation application, a user interface application, a data analysis application, etc.).

For example, processor 2A04 comprises a processor for maintaining the state of the first transactional index, wherein the first transactional index does not incorporate the metadata amendment, building a second transactional index incorporating the metadata amendment, determining whether an indication to switch from the first transactional index to the second transactional index has been received, and indicating to switch from using the first transactional index to the second transactional index for queries regarding the system data. In some embodiments, processor 2A04 provides a building toggle control for building a new transactional index. For example, a building toggle control comprises an externally accessible method call (e.g., an application programming interface endpoint) for receiving an indication (e.g., an indication to build a new transactional index). In some embodiments, processor 2A04 provides a use toggle control for switching from using a first transactional index to a second transactional index for queries regarding system data. In some embodiments, the processor provides a select control for selecting a transactional index for use in testing. For example, a select control comprises an externally accessible method call (e.g., an application programming interface endpoint) for receiving a selection (e.g., a selection of a transactional index for use in testing). In some embodiments, testing comprises the use of the transactional index for determining whether the transactional index is operating as it is supposed to—for example, testing whether the transactional index is providing the same responses as the existing transactional index or, if appropriate, providing improved answers over the existing transactional index (e.g., improved in the sense that it incorporates changes to the index such as improved index data structures). In some embodiments, the toggle indication is based on a time and/or date as indicated by the developer using a user interface and the indication is provided by the database index system and received based on that time and/or date. Storage 2A14 comprises amendment data 2A16 (e.g., data describing modifications to structural definitions of to a database system), and second index 2A20 (e.g., a second transactional index comprising an index associated with a database system incorporating changes associated with amendments of amendment data 2A16). Memory 2A22 comprises first index 2A18 (e.g., a first transactional index comprising an index associated with a database system prior to changes associated with amendments of amendment data 2A16) and executing application data 2A24 comprising data associated with applications 2A06. In some embodiments, database index system 2A00 comprises a cloud system. For example, processor 2A04 comprises a cloud processor (e.g., processor 2A04 comprises one or more remote processors accessed via a network). In some embodiments, a cloud system comprises a system configured to auto-scale processor capability with usage demand (e.g., apply additional processing capability to a large processing job).

Figure 2B:
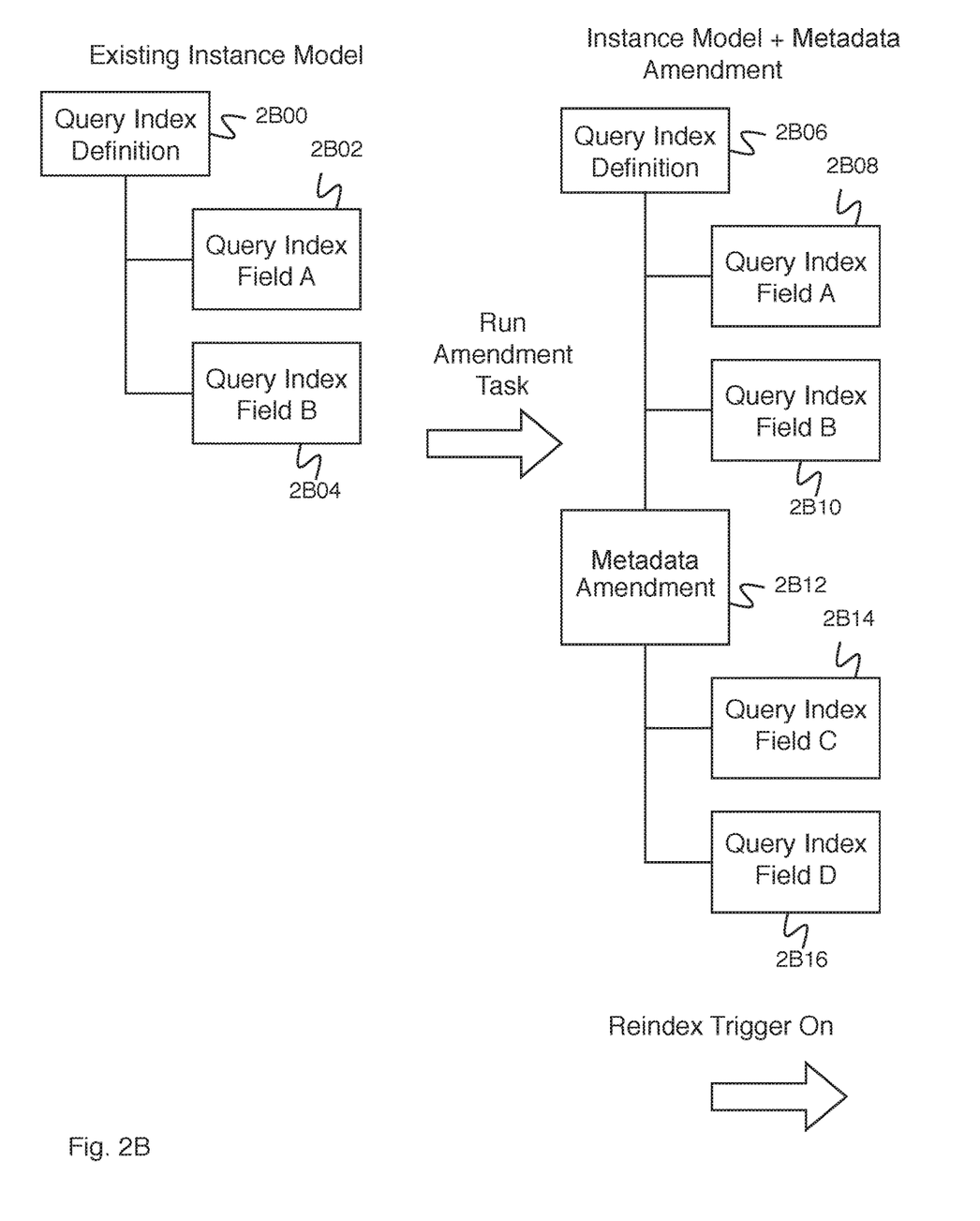
FIG. 2B is a diagram illustrating an embodiment of an instance model and a metadata amendment for an instance addition.

FIG. 2B is a diagram illustrating an embodiment of an instance model and a metadata amendment for an instance addition. In some embodiments, query index definition 2B00 comprises an object definition for use in a query index (e.g., first index 2A18 of FIG. 2A). In the example shown, an existing instance model (e.g., query index definition 2B00) is connected to query index field A 2B02 and query index field B 2B04. Query index field A 2B02 and query index field B 2B04 comprise query index fields for storing object field data indexed for querying. An instance model (e.g., query index definition 2B06) that includes one or more metadata amendments (e.g., amendments to the query index definition or transactional index schema) comprises a modified version of query index definition 2B00 after the execution of an amendment task. Query index field A 2B08 and query index field B 2B10 comprise query index field A 2B02 and query index field B 2B04 unchanged after the execution of the amendment task. Metadata amendment 2B12 comprises an indication of a query index field modification present in the modified query index definition (e.g., a modified transactional index schema). Metadata amendment 2B12 comprises an instance addition. For example, metadata amendment 2B12 indicates the addition of query index field C 2B14 and query index field D 2B16. Query index field C 2B14 and query index field D 2B16 comprise query index fields for inclusion in query index definition 2B06 after amendment activation. In some embodiments, an 'On' indication of a reindex trigger indicates to add the changes indicated by metadata amendment 2B12 to a new version of a query index.

Figure 2C:
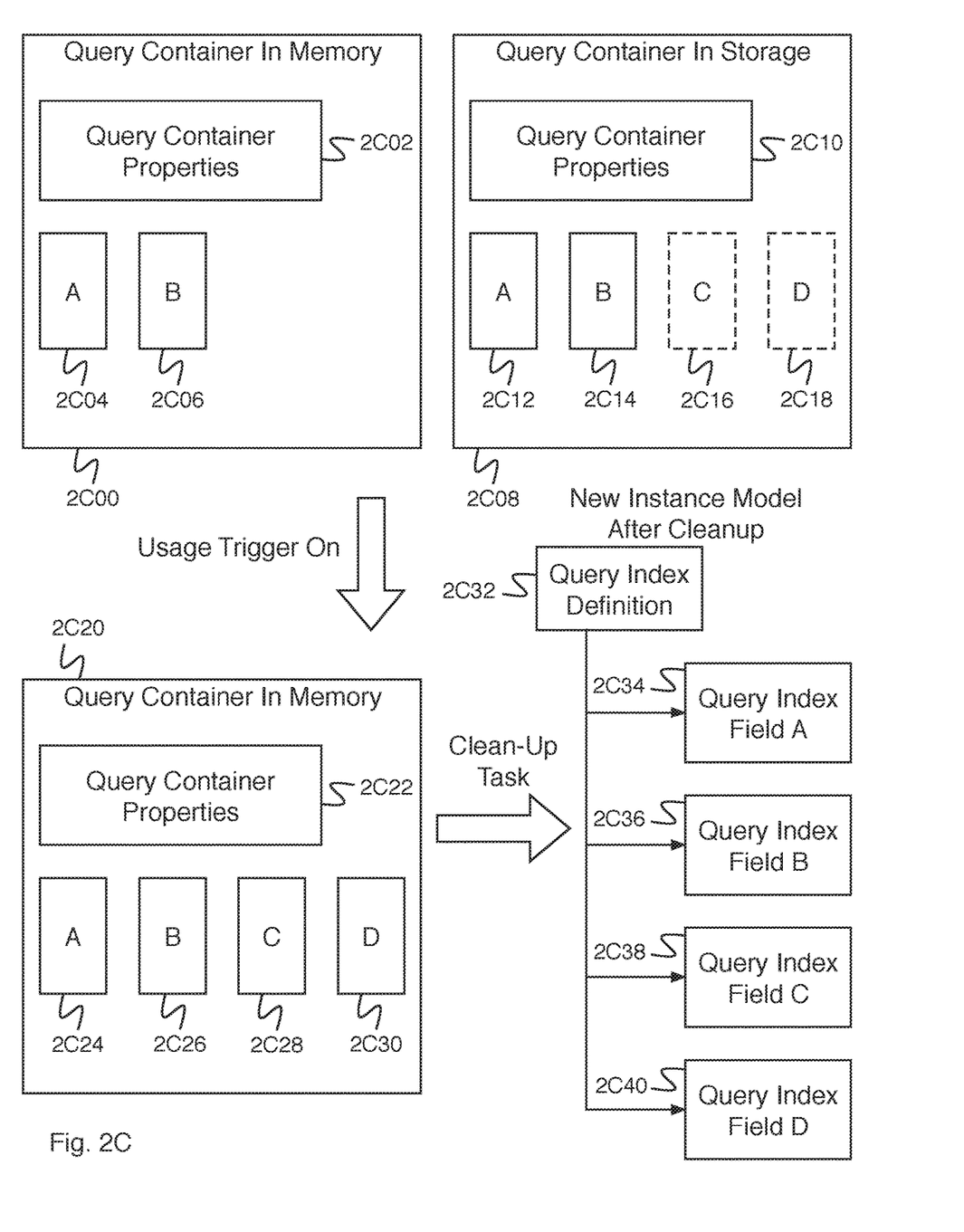
FIG. 2C is a diagram illustrating an embodiment of a query container and an instance model.

FIG. 2C is a diagram illustrating an embodiment of a query container and an instance model. In some embodiments, query container 2C00 comprises a query container in memory (e.g., as part of first index 2A18 of FIG. 2A). For example, query container 2C00 comprises a query container in an actively used query index. Query container 2C00 comprises a query container for storing object data in a query index. Query container 2C00 comprises query container properties 2C02—for example, comprising a list of query index field names, a list of query index field data types, a most recently updated date, owner data, etc. Query container 2C00 additionally comprises field A 2C04 and field B 2C06. Field A 2C04 and field B 2C06 comprise query index fields for storing queryable data. For example, field A 2C04 corresponds to query index field A 2B02 of FIG. 2B and field B 2C06 corresponds to query index field B 2B04 of FIG. 2B. Query container 2C08 comprises a stored query container (e.g., as part of second index 2A20 of FIG. 2A). Query container 2C08 comprises query container properties 2C10, field A 2C12, field B 2C14, amended field C 2C16, and amended field D 2C18. Amended field C 2C16 and amended field D 2C18 comprise fields added to query container 2C08 (e.g., fields added by a metadata amendment). For example, amended field C 2C16 and amended field D 2C18 become activated parts of query container 2C08 upon receipt of an 'On' indication to a usage trigger.

Query container 2C20 comprises a query container for storing object data in a query index. For example, query container 2C20 comprises a query container in memory including an activated amendment in response to a receipt of an 'On' indication to a usage trigger. Query container 2C20 comprises query container properties 2C22, field A 2C24, field B 2C26, field C 2C28, and field D 2C30. Field C 2C28 comprises an activated version of amended field C 2C16 after receipt of the 'On' indication to the usage trigger and field D 2C30 comprises an activated version of amended field D 2C18 after receipt of the 'On' indication to the usage trigger.

Query index definition 2C32 comprises an amended query index definition after an amendment task, an 'On' indication to a reindex trigger, an 'On' indication to a usage trigger, and/or a clean-up task. For example, query index definition 2C32 comprises an amended version of query index definition 2B00 of FIG. 2B. In the example shown, query index definition 2C32 is connected to query index field A 2C34, query index field B 2C36, query index field C 2C38, and query index field D 2C40. In some embodiments, the clean-up task removes the old versions of the query index definition (e.g., query index definition 2B00 of FIG. 2B) and replaces with the new version of the query index definition (e.g., query index definition 2C32) as well as the removal of the in memory query container (e.g., query container in memory 2C00) and the transfer of the query container in storage (e.g., query container storage 2C08) to memory (e.g., query container in memory 2C20).

Figure 2D:
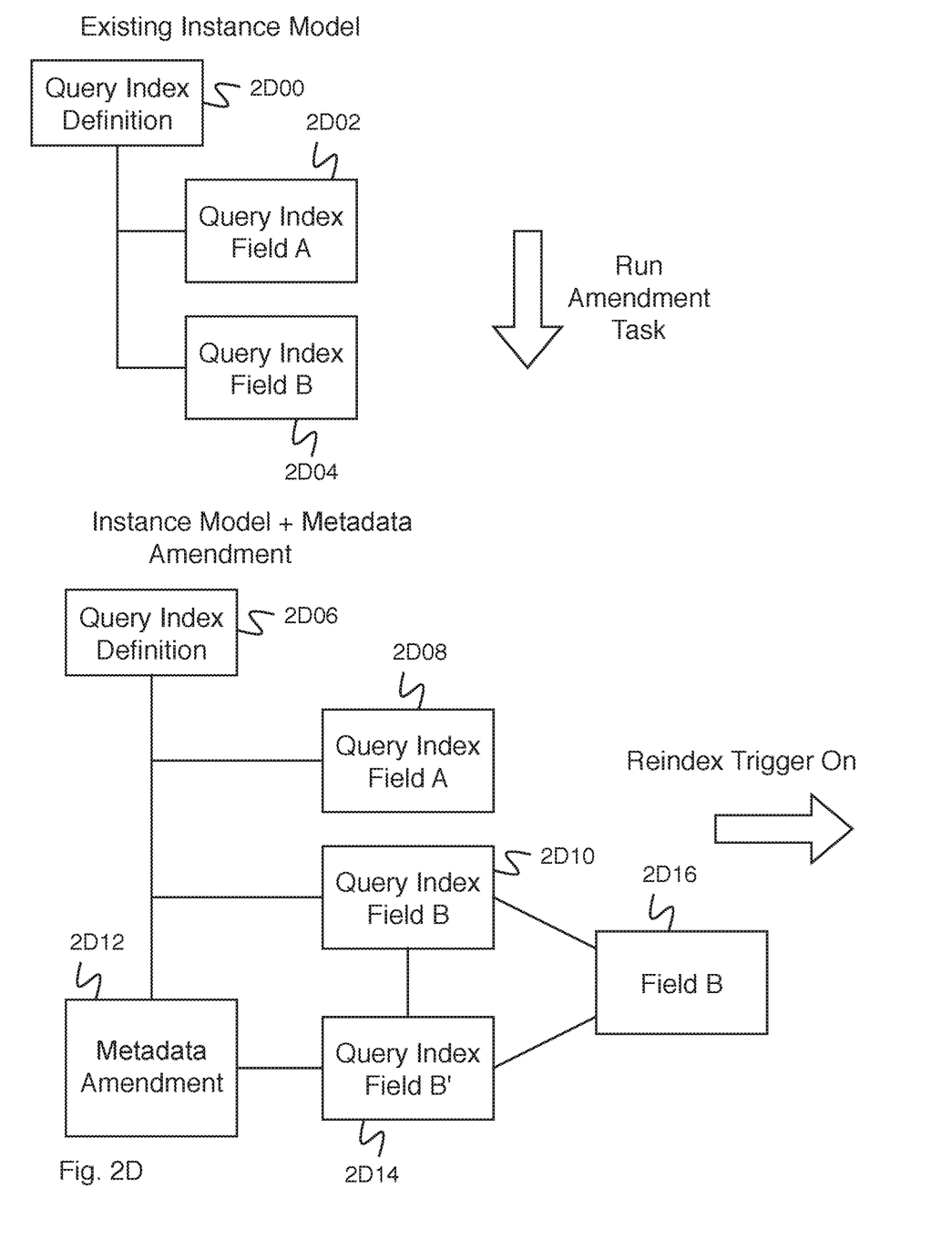
FIG. 2D is a diagram illustrating an embodiment of an instance model and a metadata amendment for an instance modification.

FIG. 2D is a diagram illustrating an embodiment of an existing instance model and a metadata amendment for an instance modification. In some embodiments, query index definition 2D00 comprises an object definition for use in a query index (e.g., first index 2A18 of FIG. 2A). In the example shown, query index definition 2D00 is connected to query index field A 2D02 and query index field B 2D04. Query index field A 2D02 and query index field B 2D04 comprise query index fields for storing object field data indexed for querying.

Query index definition 2D06 comprises a modified version of query index definition 2D00 after the execution of an amendment task (e.g., a query index definition modification). Query index field A 2D08 comprises query index field A 2D02 unchanged after the execution of the amendment task. Metadata amendment 2D12 comprises an indication of a query index field modification (e.g., transactional index schema changes) present in the modified query index definition. Metadata amendment 2D12 comprises an instance modification. For example, metadata amendment 2D12 indicates the modification of a query index field. Query index field B 2D10 comprises query index field B 2D04 unchanged after the amendment task. Query index field B' 2D14 comprises query index field B2D04 modified after the amendment task. When the amendment task triggered, the active query index field switches from query index field B 2D10 to query index field B' 2D16. Both query index field B 2D10 and query index field B' 2D14 connect to field B 2D16 (e.g., the new changed field B 2D16 comprises the old query index field B 2D10 and new changes of query index field B'). In some embodiments, an 'On' indication of a reindex trigger indicates to add the changes indicated by metadata amendment 2D12 to a new version of a query index.

Figure 2E:
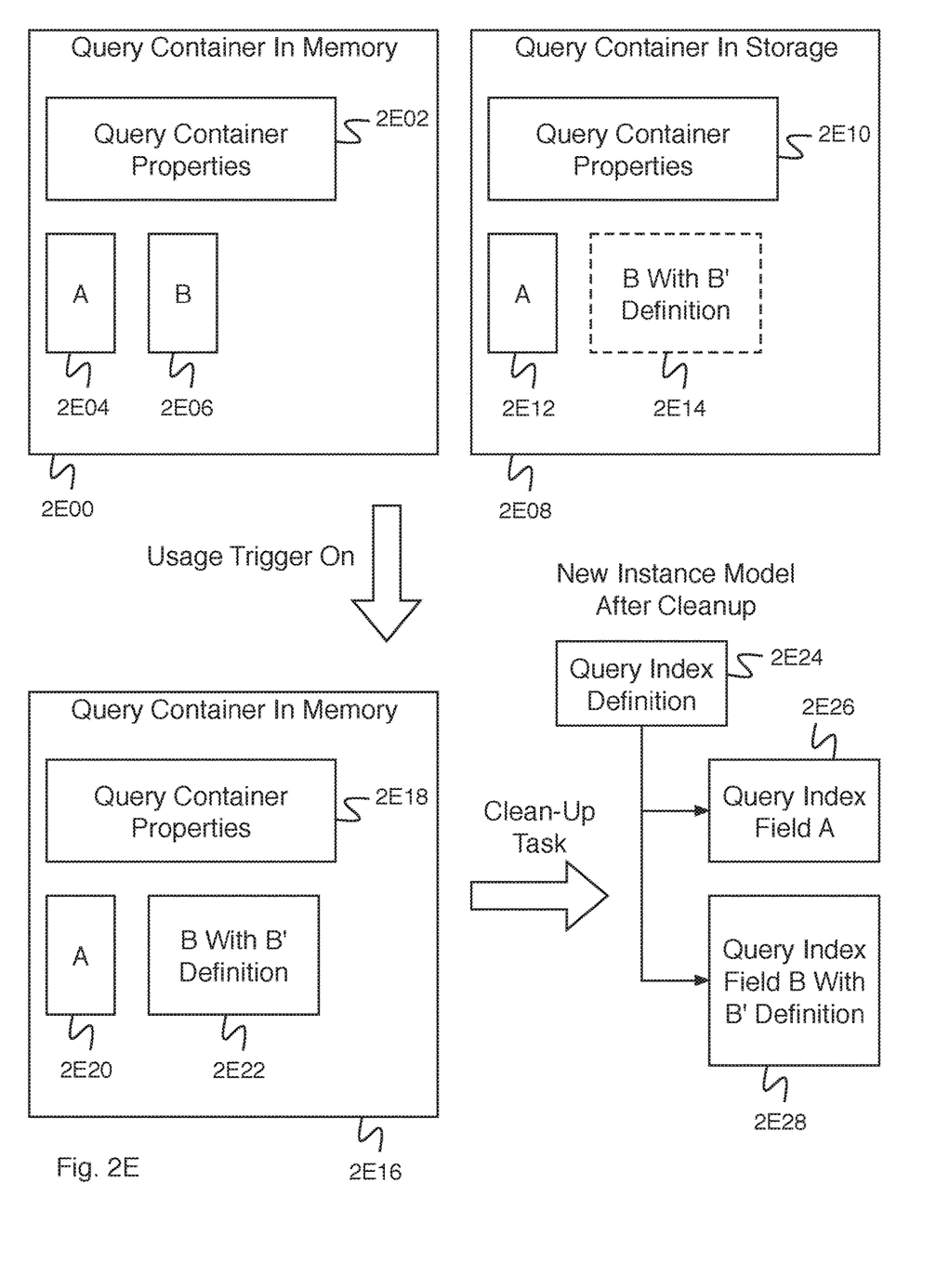
FIG. 2E is a diagram illustrating an embodiment of a query container and an instance model.

FIG. 2E is a diagram illustrating an embodiment of a query container and an instance model. In some embodiments, query container 2E00 comprises a query container in memory (e.g., as part of first index 2A18 of FIG. 2A). For example, query container 2E00 comprises a query container in an actively used query index. Query container 2E00 comprises a query container for storing object data in a query index. Query container 2E00 comprises query container properties 2E02, for example, comprising a list of query index field names, a list of query index field data types, a most recently updated date, owner data, etc. Query container 2E00 additionally comprises field A 2E04 and field B 2E06. Field A 2E04 and field B 2E06 comprise query index fields for storing queryable data. For example, field A 2E04 corresponds to query index field A 2D02 of FIG. 2D and field B 2E06 corresponds to query index field B 2D04 of FIG. 2D.

Query container 2E08 comprises a stored query container (e.g., as part of second index 2A20 of FIG. 2A). Query container 2E08 comprises query container properties 2E10, field A 2E12, and amended field B with B' definition 2E14. Amended field B with B' definition comprises a modified version of field B 2E06 to include a B' definition (e.g., B' definition defined in query index field B' 2D14 of FIG. 2D). For example, amended field B with B' definition becomes activated upon receipt of an 'On' indication to a usage trigger.

Query container 2E16 comprises a query container for storing object data in a query index. For example, query container 2E16 comprises a query container in memory including an activated amendment in response to a receipt of an 'On' indication to a usage trigger. Query container 2E16 comprises query container properties 2E18, field A 2E20, and field B with B' definition 2E22. Field B with B' definition 2E22 comprises an activated version of amended field B with B' definition 2E14 after receipt of the 'On' indication to the usage trigger.

Query index definition 2E24 comprises an amended query index definition after an amendment task, an 'On' indication to a reindex trigger, an 'On' indication to a usage trigger, and a clean-up task. For example, query index definition 2E24 comprises an amended version of query index definition 2D00 of FIG. 2D. In the example shown, query index definition 2E24 is connected to query index field A 2E26 and query index field B with B' definition 2E28. In some embodiments, the clean-up task removes the old versions of the query index definition (e.g., query index definition 2D00 of FIG. 2D) and replaces with the new version of the query index definition (e.g., query index definition 2E24) as well as the removal of the in memory query container (e.g., query container in memory 2E00) and the transfer of the query container in storage (e.g., query container storage 2E08) to memory (e.g., query container in memory 2E16).

Figure 3:
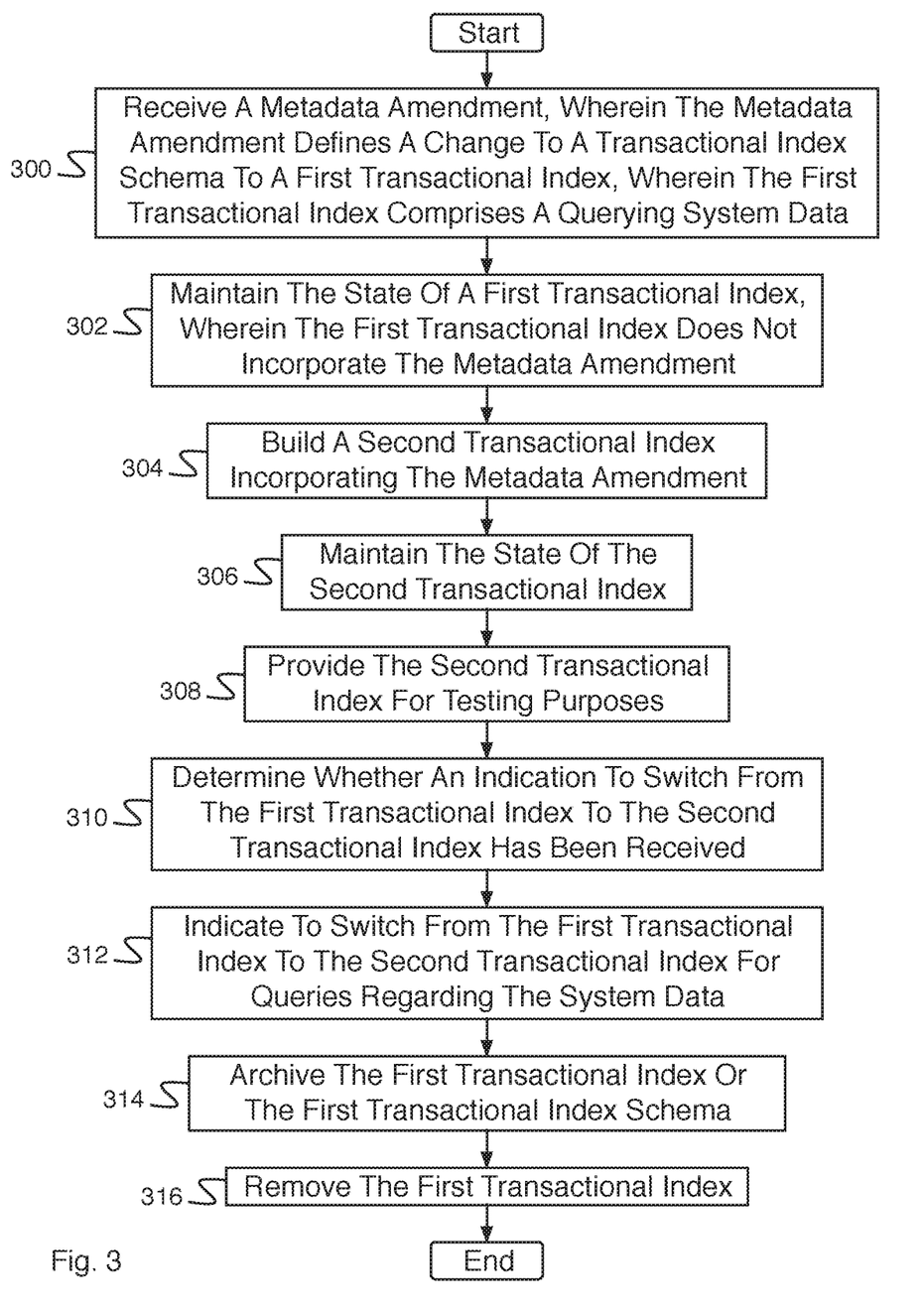
FIG. 3 is a flow diagram illustrating an embodiment of a process for indexing.

FIG. 3 is a flow diagram illustrating an embodiment of a process for indexing. In some embodiments, the process of FIG. 3 is implemented by database index system 108 of FIG. 1. In the example shown, in 300, a metadata amendment is received, wherein the metadata amendment defines a change to a transactional index schema to a first transactional index, wherein the first transactional index comprises a querying system data. For example, the metadata amendment is received from a system developer using a user system or an administrators system that is communicating with the database indexing system. In some embodiments, the metadata amendment comprises a time parameter for activating the metadata amendment (e.g., a time in the future—for example, one hour in the future, one day in the future, one week in the future, etc.). For example, a metadata amendment comprises an amendment to a class definition (e.g., a new field definition to a schema, an addition of a field to a class, a modification of a field definition, a removal of a field from a class or schema, an addition, removal, or modification of a class relationship, an addition/modification of a field that uses a new class relationship, etc.), an amendment to transactional index schema, or an amendment to a database schema (e.g., an addition of a data field, a removal of a data field, a modification of a data field, etc.). In some embodiments, the metadata amendment comprises one of a plurality of metadata amendments. For example, a set of software developers developing a database system submit a set of amendments to a database that are collected and applied to the database simultaneously. For example, a time window is allowed between a cut-off time to submit a database amendment and a time that the new transactional index incorporating the database amendment is put into effect.

In 302, the state of the first transactional index is maintained, wherein the first transactional index does not incorporate the metadata amendment. For example, maintaining the state (e.g., a first state) of the first transactional index comprises updating the first transactional index in response to a database transaction (e.g., a database transaction comprising adding data to the database, modifying data in the database, removing data from the database, etc.). In 304, a second transactional index incorporating the metadata amendment is built. For example, the second transactional index is built as a background process (e.g., the second transactional index is built by the processor in parallel with other tasks that do not wait one the completion of the build process to begin). In some embodiments, the second transactional index is built in response to receiving an indication of a building toggle control. In various embodiments, the toggle control is moved or selected in a user interface by a developer using a user system or an administrator system and that indication is provided to the database index system to indicate that the building of the second transactional index. In some embodiments, the toggle indication is based on a time and/or date as indicated by the developer using a user interface and the indication is provided by the database index system and received based on that time and/or date. In some embodiments, a plurality of processors contribute to building the second transactional index (e.g., a parallel processing cluster, a plurality of processors in the cloud, a plurality of virtual processors, etc.). In 306, the state of the second transactional index (e.g., a second state) is maintained. In some embodiments, maintaining the state of the first transactional index and building the second transactional index are performed in parallel processes (e.g., performed simultaneously by one or more processors). For example, maintaining the state of the first transactional index (e.g., the first state) and building the second transactional index are performed using separate cloud processors, separate servers, or separate virtual servers.

In 308, the second transactional index is provided for testing purposes. In 310, the process determines whether an indication to switch from the first transactional index to the second transactional index has been received. For example, the toggle control is moved or selected in a user interface by a developer using a user system or an administrator system and that indication is provided to the database index system to indicate that the building of the second transactional index. In some embodiments, the toggle indication is based on a time and/or date as indicated by the developer using a user interface and the indication is provided by the database index system and received based on that time and/or date. In 312, the process indicates to switch from the first transactional index to the second transactional index for queries regarding the system data. For example, the process indicates to switch from the first transactional index to the second transactional index for queries regarding the system data in the event it is determined in 308 that an indication to switch from the first transactional index to the second transactional index has been received. In some embodiments, queries and/or searches of the database index that are received by the database index system are executed using the newly switched-to transactional index. In some embodiments, the system indicates the index to use for queries and/or searches by storing the in-memory/storage location of the index as a pointer and the index used for the queries and/or searches is determined based on the pointer. In some embodiments, the indication to switch comprises a change in the pointer. In 314, the first transactional index or the first transactional index schema is archived. For example, after the indication to switch, the first transactional index schema is archived for reference. In 316, the first transactional index is removed. For example, the first transactional index is deleted from memory and/or storage or is removed to a backup storage.

Figure 4:
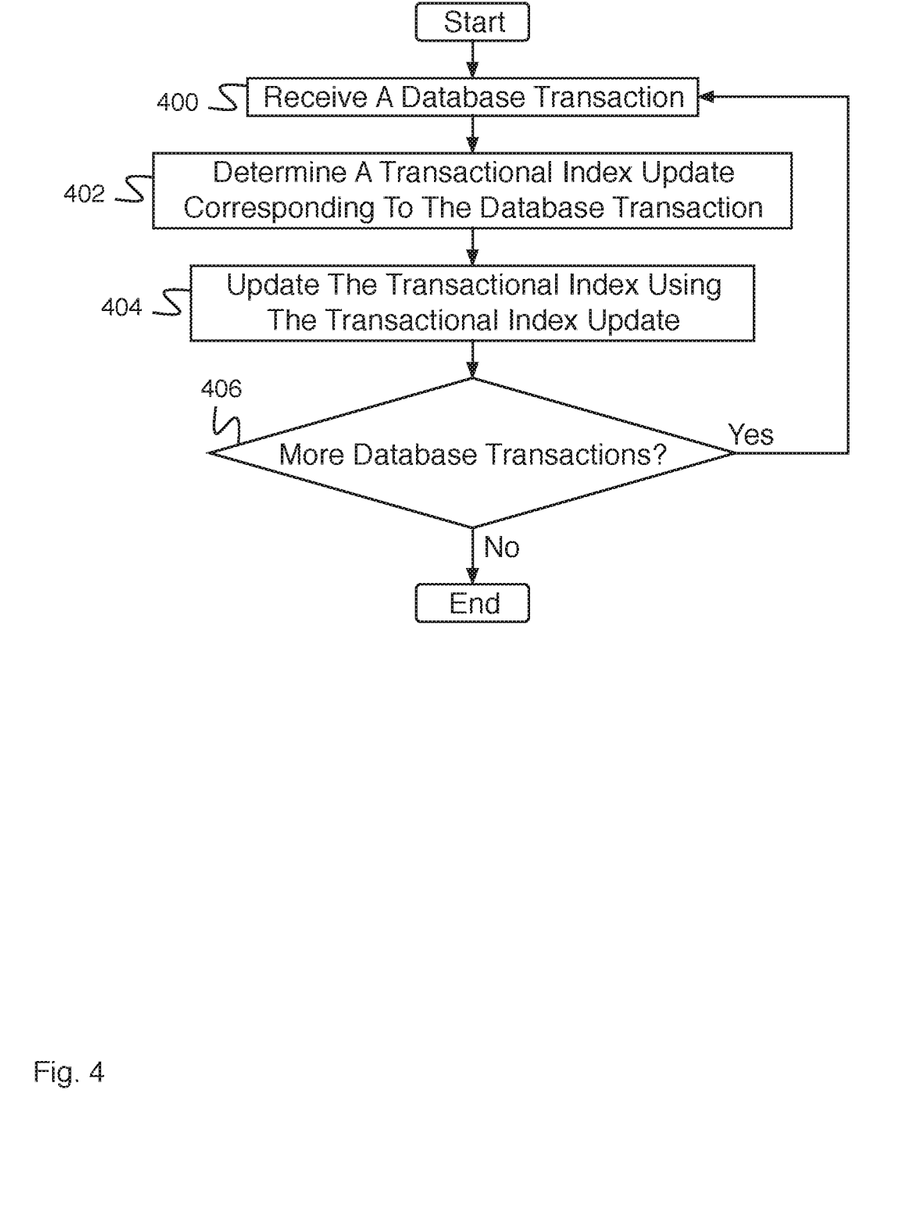
FIG. 4 is a flow diagram illustrating an embodiment of a process for maintaining a transactional index.

FIG. 4 is a flow diagram illustrating an embodiment of a process for maintaining a transactional index. In some embodiments, the process of FIG. 4 implements 302 of FIG. 3 or 306 of FIG. 3. In the example shown, in 400, a database transaction is received. For example, a database transaction is received from a user or from another system, and the database transaction comprises an indication to add data to a database, modify data in a database, etc. A database transaction is received from a database system in response to a database action (e.g., a database action initiated by a user or an automatically scheduled database action). In 402, a transactional index update corresponding to the database transaction is determined. For example, a transactional index update comprises an entry to add to the transactional index, an entry to remove from the transactional index, or an entry to modify in the transactional index. In 404, the transactional index is updated using the transactional index update. In 406, it is determined whether there are more database transactions. In the event it is determined that there are more database transactions, control passes to 400. In the event it is determined that there are not more database transactions, the process ends.

Figure 5:
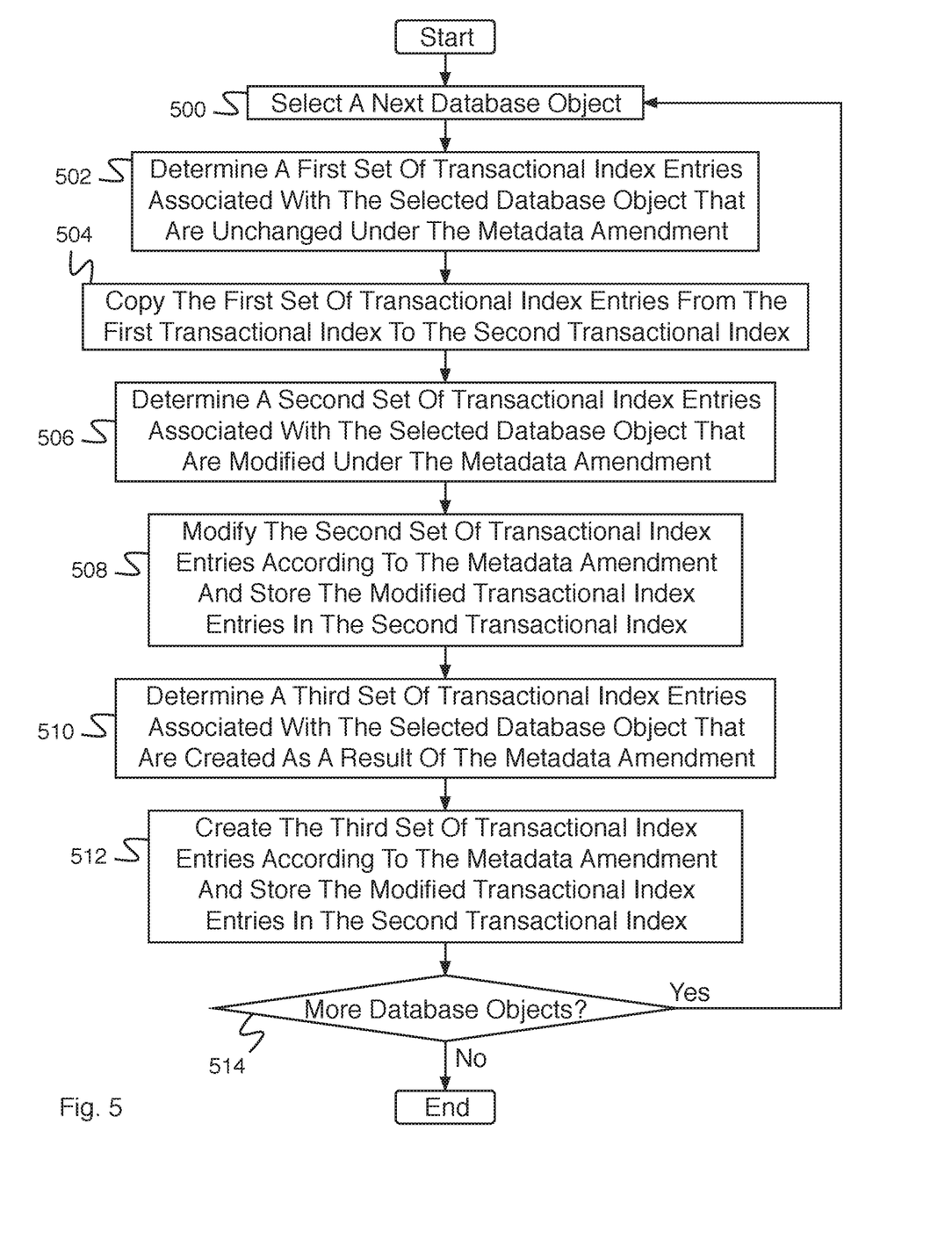
FIG. 5 is a flow diagram illustrating an embodiment of a process for building a transactional index incorporating a metadata amendment.

FIG. 5 is a flow diagram illustrating an embodiment of a process for building a transactional index incorporating a metadata amendment. In some embodiments, the process of FIG. 5 implements 304 of FIG. 3. In the example shown, in 500, a next database object is selected. In some embodiments, the first database object is selected. For example, a database comprises a plurality of interconnected database objects, each database object representing a concept (e.g., worker, financial transaction, location, etc.) and comprising a set of data fields for storing data and a set of relations for storing connections to other database objects. In 502, a first set of transactional index entries associated with the selected database object that are unchanged under the metadata amendment is determined. In 504, the first set of transactional index entries are copied from the first transactional index to the second transactional index. In 506, a second set of transactional index entries associated with the selected database object that are modified under the metadata amendment is determined. In some embodiments, the selected database object is deleted and the transactional index entries associated with the selected data base object are modified by being removed from the index. In 508, the second set of transactional index entries is modified according to the metadata amendment and the modified transactional index entries are stored in the second transactional index. In 510, a third set of transactional index entries associated with the selected database object that are created as a result of the metadata amendment is determined. In 512, the third set of transactional index entries is created according to the metadata amendment and the modified transactional index entries are stored in the second transactional index. In 514, it is determined whether there are more database objects. In the event it is determined that there are more database objects, control passes to 500. In the event it is determined that there are not more database objects, the process ends.

Figure 6:
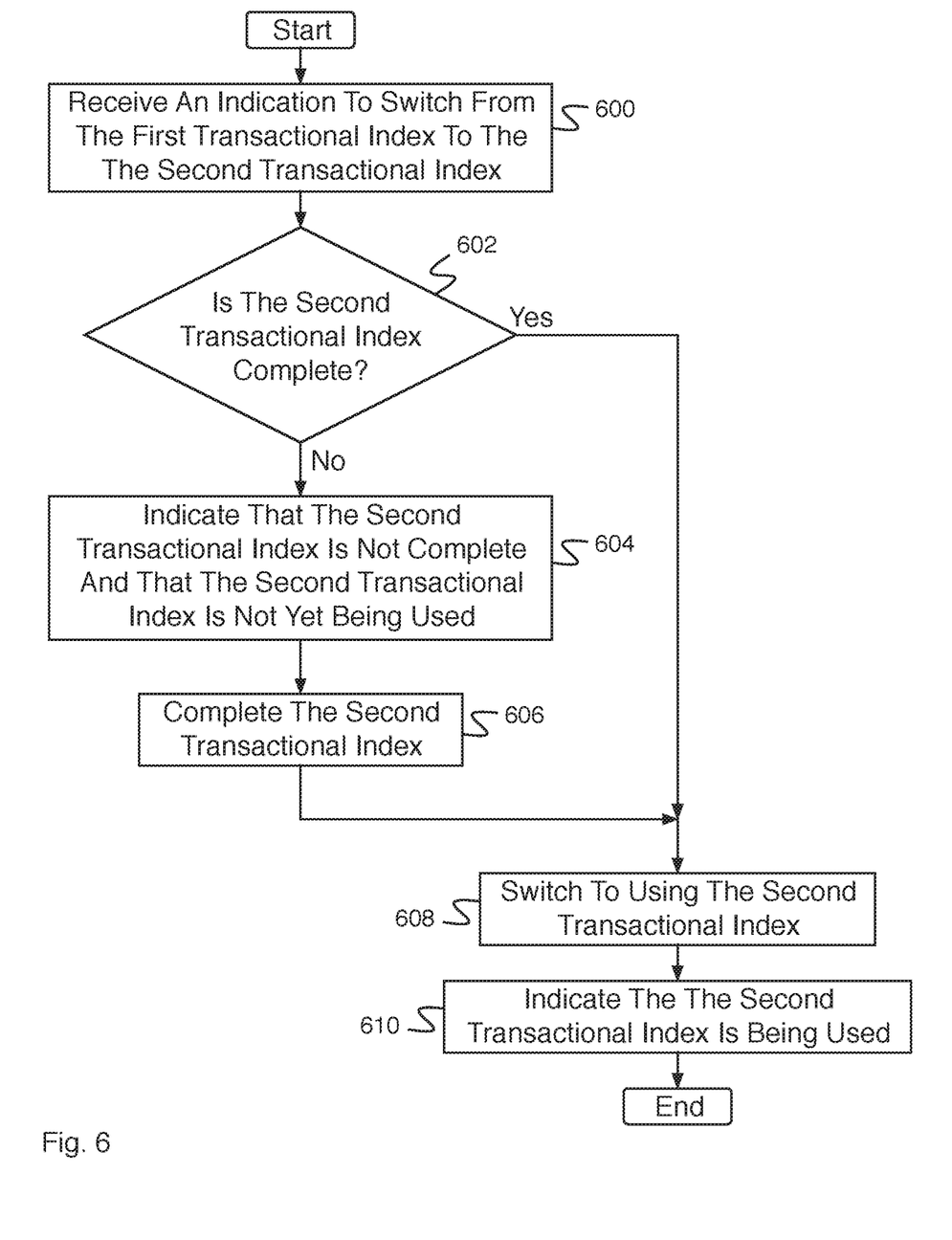
FIG. 6 is a flow diagram illustrating an embodiment of a process for indicating to switch from a first transactional index to a second transactional index.

FIG. 6 is a flow diagram illustrating an embodiment of a process for indicating to switch from a first transactional index to a second transactional index. In some embodiments, the process of FIG. 6 implements 312 of FIG. 3. In the example shown, in 600, an indication to switch from a first transactional index to a second transactional index is received. In 602, it is determined whether the second transactional index is complete (e.g., whether a process to build the second transactional index has been completed). In the event it is determined that the second transactional index is complete, control passes to 608. In the event it is determined that the second transactional index is not complete, control passes to 604. In 604, the process indicates that the second transactional index is not complete and that the second transactional index is not yet being used. In 606, the second transactional index is completed. For example, completing the second transactional index comprises processing pending transaction updates or waiting for the second transactional index build process to complete. In some embodiments, the completion of the second transactional index is forced using 606 prior to using the second transactional index in the event that the second transactional index is not current or synchronized (e.g., not complete). Control then passes to 608. In 608, the process switches to using the second transactional index. For example, switching from the first transactional index to the second transactional index comprises indicating to direct search queries to the second transactional index instead of the first transactional index. In some embodiments, the indication comprises an indication of a memory/storage location for the transactional index to be used for query and/or search requests. In some embodiments, the indication is to a transaction application for use in processing a transaction requests. In 610, the process indicates that the second transactional index is being used.

Figure 7:
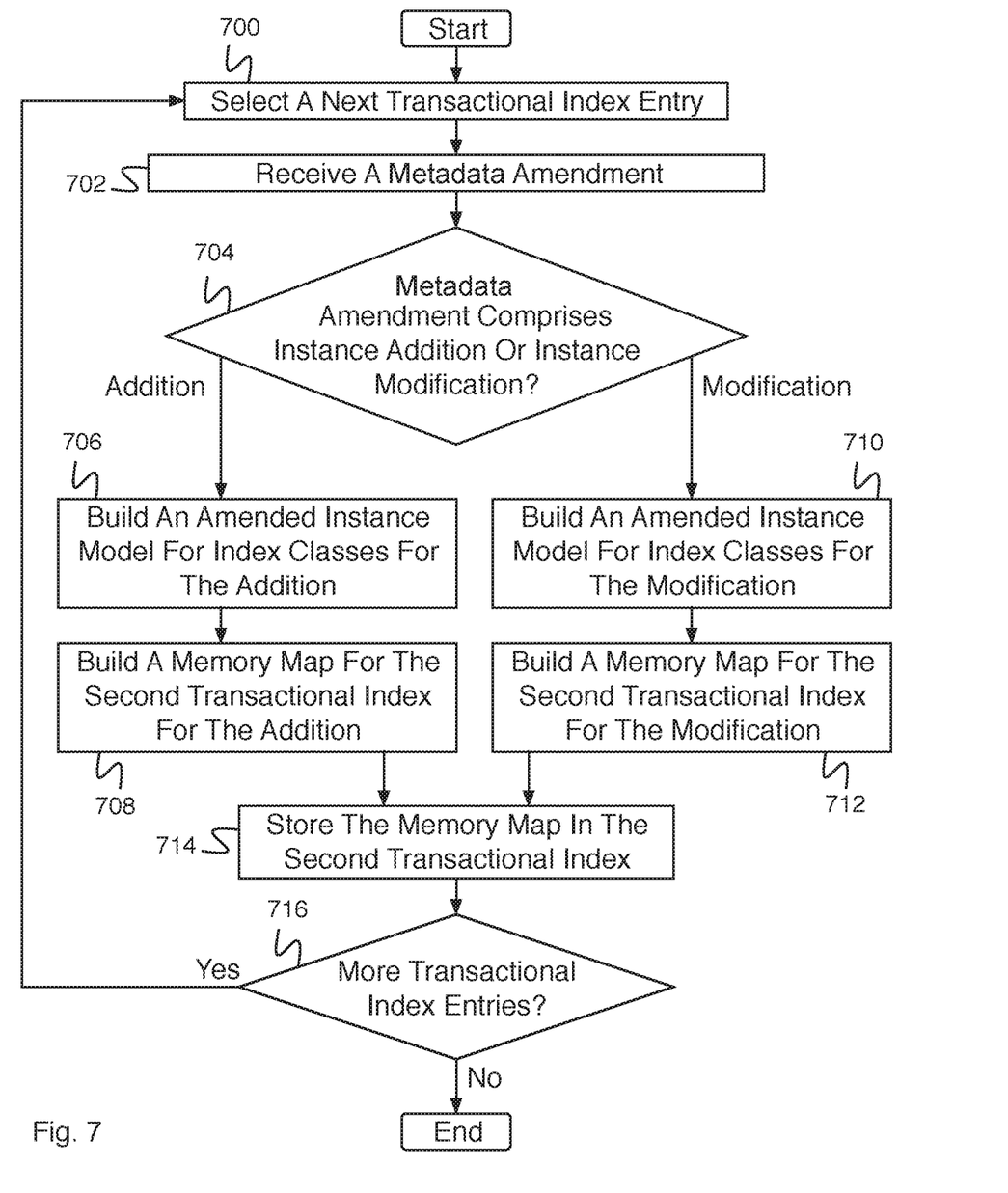
FIG. 7 is a flow diagram illustrating an embodiment of a process for modifying a set of transactional index entries and storing the modified transactional index entries in a transactional index.

FIG. 7 is a flow diagram illustrating an embodiment of a process for modifying a set of transactional index entries and storing the modified transactional index entries in a transactional index. In some embodiments, the process of FIG. 7 implements 508 of FIG. 5. In the example shown, in 700, a next transactional index entry is selected. In some embodiments, the next transactional index entry comprises the first transactional index entry. In 702, a metadata amendment is received. In some embodiments, the metadata amendment comprises a metadata amendment under which the transactional index entry is changed. In 704, it is determined whether the metadata amendment comprises instance addition or instance modification. In the event it is determined that the metadata amendment comprises instance addition, control passes to 706. In 706, an amended instance model is built for index classes for the addition. For example, an amended instance model is built including a metadata amendment as in metadata amendment 2B12 of FIG. 2B. In 708, a memory map for the second transactional index for the addition is built. For example, a memory map is built including amended fields, as in query container 2C08 of FIG. 2C. Control then passes to 714. In the event it is determined in 704 that the query index definition comprises an instance modification, control passes to 710. In 710, an amended instance model for instance classes for the modification is built. For example, an amended instance model is built including a metadata amendment as in metadata amendment 2D12 of FIG. 2D. In 712, a memory map for the second transactional index for the modification is built. For example, a memory map is built including amended fields, as in query container 2E08 of FIG. 2E. Control then passes to 714. In 714, The memory map is stored in the second transactional index. In 716, it is determined whether there are more transactional index entries. In the event it is determined that there are more transactional index entries, control passes to 700. In the event it is determined that there are not more transactional index entries, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for indexing, comprising:
an interface is configured to receive a metadata amendment, wherein the metadata amendment defines a change to a transactional index schema of a first transactional index, wherein the first transactional index comprises a query index for querying system data; and
a processor is configured to:
maintain a first state of the first transactional index, wherein the first transactional index does not incorporate the metadata amendment;
determine whether an indication to build a second transactional index has been received;
in response to a determination that the indication to build the second transactional index has been received, build the second transactional index, comprising to:
copy a first set of transactional index entries with an transactional index entry associated with first transactional index associated with a database object that are unchanged under the metadata amendment to the second transactional index;
modify a second set of transactional index entries associated with the database object that are modified under the metadata amendment, comprising to:
determine whether at least one metadata amendment associated with an transactional index entry includes an instance addition or an instance modification;
build an amended instance model for index classes for the instance addition or the instance modification; and
build a memory map for the second transactional index for the instance addition or the instance modification; and
create a third set of transactional index entries associated with the database object that are created as a result of the metadata amendment;
validate the second transactional index, comprising to test whether the second transactional index is providing a same response as the first transactional index;
determine whether an indication to switch from the first transactional index to the second transactional index has been received;
in response to a determination that the indication to switch from the first transactional index to the second transactional index has been received, indicate to switch from the first transactional index to the second transactional index, wherein the switch enables querying the system data using the change indicated by the metadata amendment;
receive a query regarding the second transactional index; and
provide a response to the query.

2. The system of claim 1, wherein the metadata amendment comprises a time for indicating to switch from the first transactional index to the second transactional index.

3. The system of claim 1, wherein the metadata amendment comprises a schema amendment to a database schema.

4. The system of claim 1, wherein the metadata amendment comprises one of a plurality of metadata amendments.

5. The system of claim 1, wherein the metadata amendment comprises an addition of a new field definition to a schema, a modification of a field definition, a removal of a field from the schema, and/or an addition/modification of the field that uses a new class relationship.

6. The system of claim 1, wherein maintaining the first state of the first transactional index comprises updating the first transactional index in response to a database transaction.

7. The system of claim 1, wherein the second transactional index is built as a background process.

8. The system of claim 1, wherein indicating to switch from the first transactional index to the second transactional index comprises indicating a change for a location of an index to be used from a first location of the first transactional index to a second location of the second transactional index.

9. The system of claim 1, wherein the processor is further configured to:
in response to the determination that the indication to switch from the first transactional index to the second transactional index has been received, determine whether the second transactional index is complete prior to switching.

10. The system of claim 1, wherein the processor is further configured to maintain a second state of the second transactional index after it is built.

11. The system of claim 1, wherein the processor is further configured to provide the second transactional index for testing purposes.

12. The system of claim 1, wherein maintaining the first transactional index and building the second transactional index are performed in parallel processes.

13. The system of claim 1, wherein switching from the first transactional index to the second transactional index comprises indicating to direct search queries to the second transactional index instead of the first transactional index.

14. The system of claim 1, wherein the processor is further configured to provide a building toggle control for building the second transactional index.

15. The system of claim 1, wherein the processor is further configured to provide a use toggle control for switching from using the first transactional index to the second transactional index for queries regarding the system data.

16. The system of claim 1, wherein the processor is further configured to provide a select control for selecting a transactional index for use in testing.

17. The system of claim 1, wherein the processor is further configured to remove the first transactional index after the switch to the second transactional index.

18. The system of claim 1, wherein the processor is further configured to archive the first transactional index or the first transactional index schema.

19. A method for indexing, comprising:
receiving a metadata amendment, wherein the metadata amendment defines a change to a transactional index schema to a first transactional index, wherein the first transactional index comprises a querying system data;
maintaining, using a processor, a first state of the first transactional index, wherein the first transactional index does not incorporate the metadata amendment;
determining whether an indication to build a second transactional index has been received;
in response to a determination that the indication to build the second transactional index has been received, building the second transactional index comprising:
copying a first set of transactional index entries associated with first transactional index associated with a database object that are unchanged under the metadata amendment to the second transactional index;
modifying a second set of transactional index entries associated with the database object that are modified under the metadata amendment, comprising:
determining whether at least one metadata amendment associated with an transactional index entry includes an instance addition or an instance modification;
building an amended instance model for index classes for the instance addition or the instance modification; and
building a memory map for the second transactional index for the instance addition or the instance modification; and
creating a third set of transactional index entries associated with the database object that are created as a result of the metadata amendment;
validating the second transactional index, comprising testing whether the second transactional index is providing a same response as the first transactional index;
determining whether an indication to switch from the first transactional index to the second transactional index has been received; and
in response to a determination that the indication to switch from the first transactional index to the second transactional index has been received, indicating to switch from using the first transactional index to the second transactional index, wherein the switch enables querying the system data using the change indicated by the metadata amendment;
receiving a query regarding the second transactional index; and
providing a response to the query.

20. A computer program product for indexing, the computer program product being embodied in a non-transitory computer readable storage medium and comprising computer instructions for:
receiving a metadata amendment, wherein the metadata amendment defines a change to a transactional index schema to a first transactional index, wherein the first transactional index comprises a querying system data;
maintaining a first state of the first transactional index, wherein the first transactional index does not incorporate the metadata amendment;
determining whether an indication to build a second transactional index has been received;
in response to a determination that the indication to build the second transactional index has been received, building the second transactional index comprising:
copying a first set of transactional index entries associated with first transactional index associated with a database object that are unchanged under the metadata amendment to the second transactional index;

modifying a second set of transactional index entries associated with the database object that are modified under the metadata amendment, comprising:
  determining whether at least one metadata amendment associated with an transactional index entry includes an instance addition or an instance modification;
  building an amended instance model for index classes for the instance addition or the instance modification; and
  building a memory map for the second transactional index for the instance addition or the instance modification; and
creating a third set of transactional index entries associated with the database object that are created as a result of the metadata amendment;
validating the second transactional index, comprising testing whether the second transactional index is providing a same response as the first transactional index;

determining whether an indication to switch from the first transactional index to the second transactional index has been received; and
in response to a determination that the indication to switch from the first transactional index to the second transactional index has been received, indicating to switch from using the first transactional index to the second transactional index, wherein the switch enables querying the system data using the change indicated by the metadata amendment;
receiving a query regarding the second transactional index; and
providing a response to the query.

21. The system of claim 1, wherein the switch switches the change indicated by the metadata amendment from an inactivated portion of the second transactional index to an activated portion of the second transactional index.

* * * * *